(No Model.) 2 Sheets—Sheet 1.
C. C. BURTON.
TROLLEY WHEEL.
No. 538,409. Patented Apr. 30, 1895.
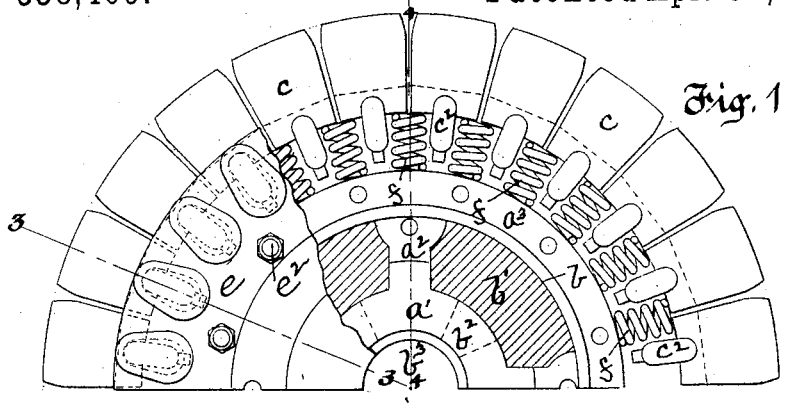
Fig. 1
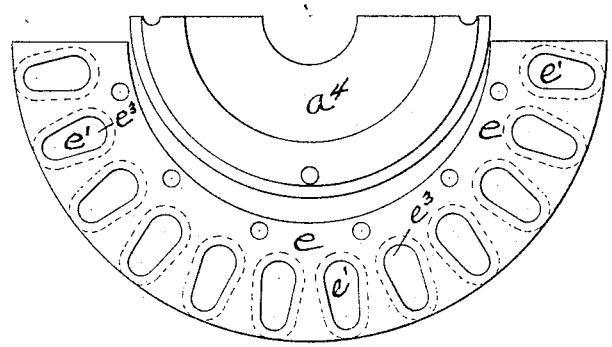
Fig. 2
Fig. 3      Fig. 4
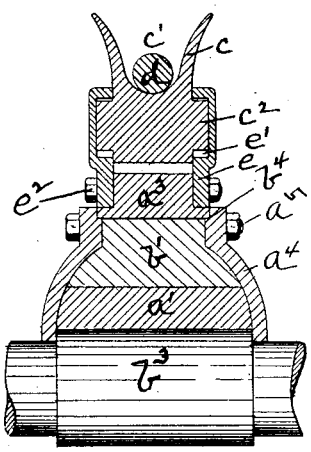 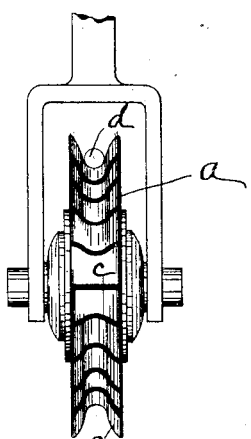 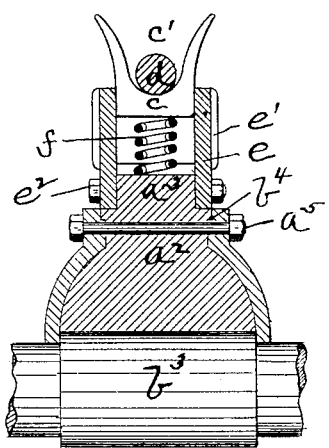
Fig. 5
Witnesses
L. deB. Little
Robert C. Totten
Inventor
Charles C. Burton
By Kay & Totten
Attorneys (No Model.) 2 Sheets—Sheet 2.

C. C. BURTON.
TROLLEY WHEEL.

No. 538,409. Patented Apr. 30, 1895.

Witnesses
L. deB. Little
Robert C. Totten

Inventor
Charles C. Burton
By Kay & Totten
Attorneys

UNITED STATES PATENT OFFICE.

CHARLES C. BURTON, OF PITTSBURG, PENNSYLVANIA, ASSIGNOR OF FOUR-FIFTHS TO CURTIS G. HUSSEY AND JOHN C. DES GRANGES, OF SAME PLACE, LEWIS E. HOLDEN, OF BELOIT, WISCONSIN, AND GEORGE M. LUDLOW, OF CHICAGO, ILLINOIS.

TROLLEY-WHEEL.

SPECIFICATION forming part of Letters Patent No. 538,409, dated April 30, 1895.

Application filed August 24, 1894. Serial No. 521,153. (No model.)

*To all whom it may concern:*

Be it known that I, CHARLES C. BURTON, a resident of Pittsburg, in the county of Allegheny and State of Pennsylvania, have invented a new and useful Improvement in Trolley-Wheels; and I do hereby declare the following to be a full, clear, and exact description thereof.

My invention relates to electric current transmission wheels, or as they are more commonly termed, trolley wheels.

The present invention bears a close relation to an invention set forth in an application for Letters Patent, filed by me on the 11th day of August, 1894, Serial No. 520,075.

To enable others skilled in the art to make and use my invention, I will describe the same more fully, referring to the accompanying drawings, in which—

Figure 6:
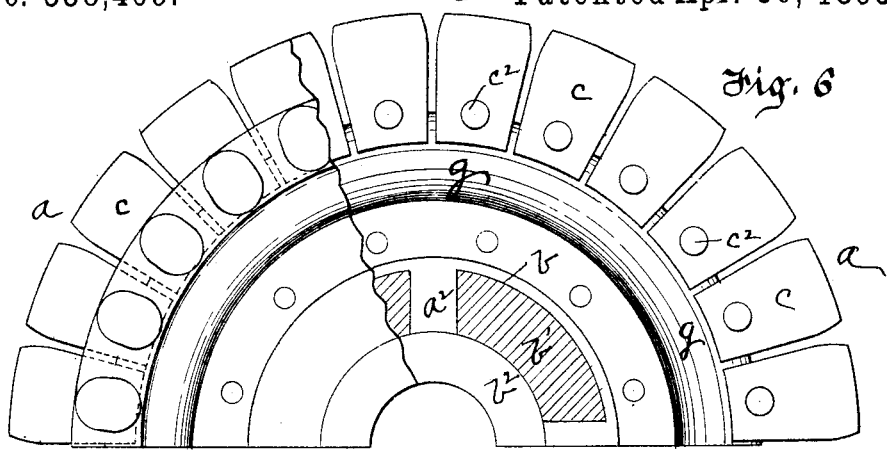
Figure 7:
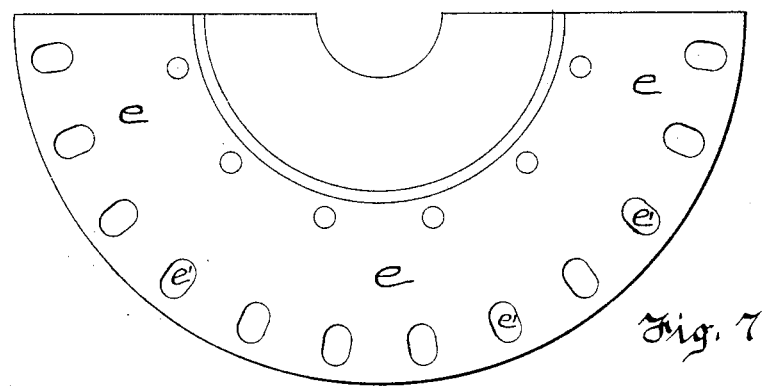
Figure 8:
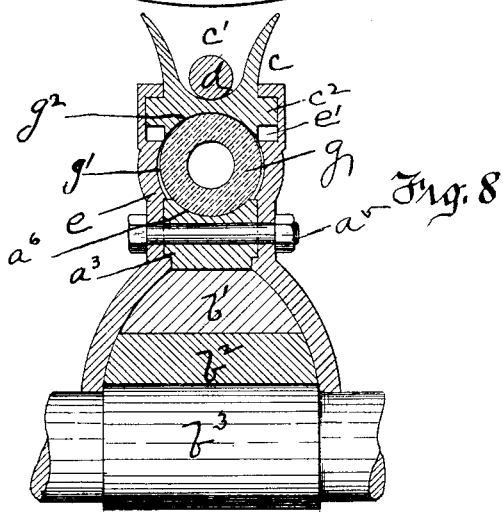

Figure 1 is a side view of a section of my improved wheel partly broken away. Fig. 2 is a view of the outside plates. Fig. 3 is a section on the line 3 3, Fig. 1. Fig. 4 is a section on the line 4 4, Fig. 1. Fig. 5 is a top view. Figs. 6, 7, and 8 are views of another form of my invention.

Like letters indicate like parts in each view.

The trolley wheel $a$ may be mounted to operate in a vertical or horizontal position as may be desired. The said trolley wheel is composed of the hub $a'$, spokes $a^2$ and rim $a^3$, the hub and spokes being incased by the plates $a^4$ secured together by the bolts $a^5$.

The spaces $b$ between the several spokes form chambers for the reception of felt or other suitable absorbent material $b'$. The hub $a'$ has the passages $b^2$ communicating with the chambers $b$ whereby the lubricant employed finds its way to the journal $b^3$. When the wheel $a$ is in motion the centrifugal force will throw the lubricant toward the rim $a^3$, but when the wheel is at rest the felt $b'$ by capillary attraction draws the lubricant from the rim toward the center whence it makes its way by the passages $b^2$ to the journal $b^3$. In order to make an oil-tight connection between the rim $a^3$ and the plate $a^4$, said plates are formed with the shoulders $b^4$ with which the rim $a^3$ engages, so that when the bolts $a^5$ are tightened a very close connection is formed which will prevent the leakage of oil. Encircling the rim $a^3$ are the contact blocks $c$, said contact blocks having the groove $c'$ through which the conductor $d$ passes. The contact blocks $c$ are further provided with the oblong lugs $c^2$ on both sides thereof. The lugs $c^2$ are adapted to enter the oblong seats or recesses $e'$ formed around the retaining rings $e$, said retaining rings $e$ being held in place on both sides of the wheel by means of the bolts $e^2$ passing through said rings and the rim $a^3$. The recesses $e'$ are of greater length than the lugs $c^2$, and consequently said lugs are free to move up and down therein. Furthermore the recesses $e'$ gradually increase in width toward the lower ends $e^3$, whereby the lower ends of said lugs $c^2$ have a certain amount of play therein thus imparting a rocking movement to the contact blocks $c$.

In order that the contact blocks $c$ may be forced normally outward, I employ the springs $f$. These springs $f$ are interposed between the periphery of the rim $a^3$ and the bottom faces of the contact blocks $c$, one spring engaging two adjoining blocks between the lugs $c^2$.

In Figs. 6, 7, and 8 I have illustrated my invention in another form. The lugs $c^2$ are circular in form and adapted to enter the oblong recesses $e'$. The rim $a^3$ has the groove $a^6$ to receive the yielding cushion or tire $g$. The retaining rings $e$ and contact blocks $c$ are formed with the grooves $g'$, $g^2$, respectively, to conform to the shape of the yielding tire $g$.

When my improved trolley wheel is in use and traveling in contact with the conductor $d$ it is forced up into contact with said conductor by the ordinary spring mechanism commonly employed. The trolley wheel is forced against the conductor with sufficient force to depress two or more of the contact blocks. As the contact blocks are depressed the lugs $c^2$ slide down in the recesses $e'$, while at the same time the enlarged ends $e^3$ of said recesses permit of the rocking of said blocks slightly to enable them to conform to the conductor, so that the faces of three or more blocks are held in contact with the conductor. This brings the conductor into contact with a greater portion of the periphery of the wheel than where the ordinary rigid contact surface is employed. The current thus taken up by the wheel may be transmitted by any suitable means to the motor.

What I claim as my invention, and desire to secure by Letters Patent, is—

1. An electric current transmitting or trolley wheel having seats or recesses formed therein, and a series of yielding contact blocks, each of said blocks being formed of one piece of metal, and lugs on the outer faces of said blocks adapted to move back and forth in said seats or recesses, substantially as set forth.

2. An electric current transmitting or trolley wheel having seats or recesses formed therein, said seats or recesses widening toward the inner ends thereof, and a series of yielding contact blocks, each of said blocks being formed of one piece of metal, and lugs on the outer faces of said blocks adapted to move back and forth in said seats or recesses, substantially as set forth.

3. An electric current transmitting or trolley wheel having a rigid rim, a series of yielding contact blocks around the periphery of said rim, lugs on said blocks, and retaining rings having recesses formed therein secured to said rim, said lugs entering said recesses and adapted to move back and forth therein, substantially as and for the purposes set forth.

4. An electric current transmitting or trolley wheel having a rigid rim, contact blocks around the periphery of said rim, lugs on said blocks, retaining rings having recesses formed therein, secured to said rim, said lugs entering said recesses and adapted to move back and forth therein, and a yielding body interposed between said rim and said blocks, substantially as and for the purposes set forth.

5. An electric current transmitting or trolley wheel having a rigid rim, contact blocks around the periphery of said rim, lugs on said blocks, retaining rings having recesses formed therein secured to said rim, said lugs entering said recesses, and adapted to move back and forth therein, and springs interposed between said rim and said blocks, substantially as and for the purposes set forth.

In testimony whereof I, the said CHARLES C. BURTON, have hereunto set my hand.

CHARLES C. BURTON.

Witnesses:
ROBT. D. TOTTEN,
ROBERT C. TOTTEN.